United States Patent [19]
Sylvain

[11] Patent Number: 5,356,094
[45] Date of Patent: Oct. 18, 1994

[54] SCORPION WING

[76] Inventor: Rick Sylvain, 2443 Fillmore #235, San Francisco, Calif. 94115

[21] Appl. No.: 21,651

[22] Filed: Mar. 4, 1987

[51] Int. Cl.⁵ .............................................. B64C 3/56
[52] U.S. Cl. .................... 244/49; 244/123; 244/124; 244/2
[58] Field of Search .............. 244/219, 123, 124, 49; 403/102, 41, 100, 109, 101, 292, 291, 55; 52/108; 416/88, 142

[56] References Cited

U.S. PATENT DOCUMENTS

| | | | |
|---|---|---|---|
| 1,050,530 | 1/1913 | Froberg | 244/124 |
| 1,739,798 | 12/1929 | McCrea | 244/49 |
| 1,810,762 | 6/1931 | Gish | 244/119 |
| 1,819,794 | 8/1931 | Schultze | 244/49 |
| 2,623,713 | 12/1952 | Foster | 244/49 |
| 2,712,421 | 7/1955 | Naumann | 244/49 |
| 3,427,769 | 2/1969 | Star | 52/108 |
| 3,637,168 | 1/1972 | Ryan et al. | 416/88 |
| 3,886,700 | 6/1975 | Lambert | 52/108 |

FOREIGN PATENT DOCUMENTS

| | | | |
|---|---|---|---|
| 2720141 | 11/1978 | Fed. Rep. of Germany | 244/49 |
| 903430 | 10/1945 | France | 244/49 |
| 474003 | 10/1937 | United Kingdom | 244/49 |
| 773739 | 7/1955 | United Kingdom | 244/49 |

Primary Examiner—Galen Barefoot

[57] ABSTRACT

A foldable, multisectional air foil with apparatus enabling it to fold or curl up or down about the body of a craft; and to a system to maintain air foil rigidity during flight. This system includes three separate assemblages which may be used in combination: sliding spar, continuous strap and cable pressure. The former includes apparatus for a sliding segmented spar within a segmented spar built into the air foil sections, which allows the air foil to fold when the joints of both spars are aligned yet provides sufficient rigidity when said joints are offset. The continuous strap assemblage provides for the air foil to be encircled by continuous yet segmented straps, each section of which contains hinging and locking mechanisms allowing the air foil sections to fold and unfold yet which—when locked into place as a continuous strap—provide structural strength to the air foil whole. The third assemblage provides pressure from the air foil tips, inward, by means of a cable mechanism capable of providing high tension to firmly unite the sections during flight as well as allowing sectional folding when released. In locked position, these assemblages provide sufficient rigidity to a multisectional air foil; when released, they allow complete foldability of the air foil.

11 Claims, 8 Drawing Sheets

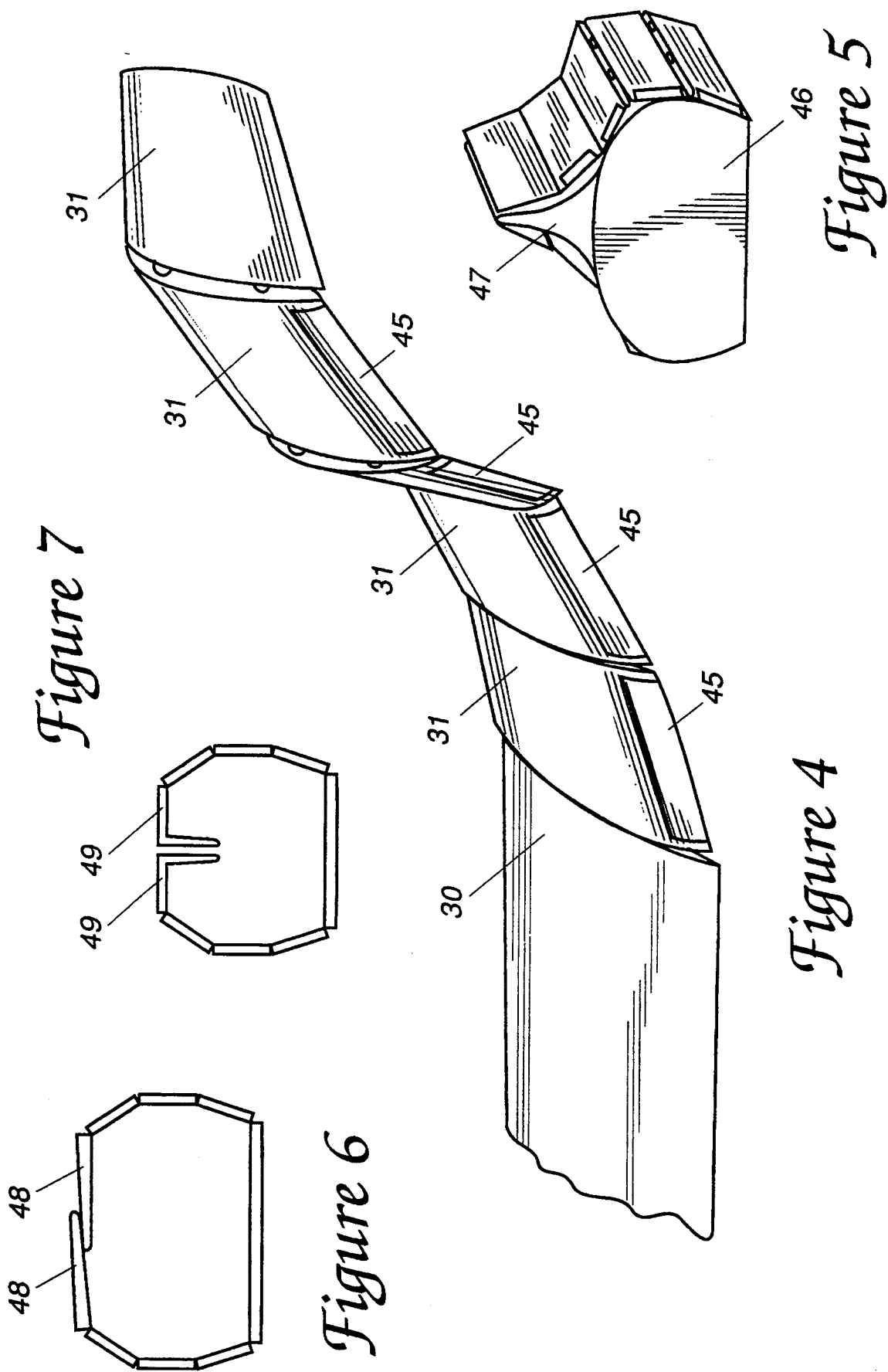

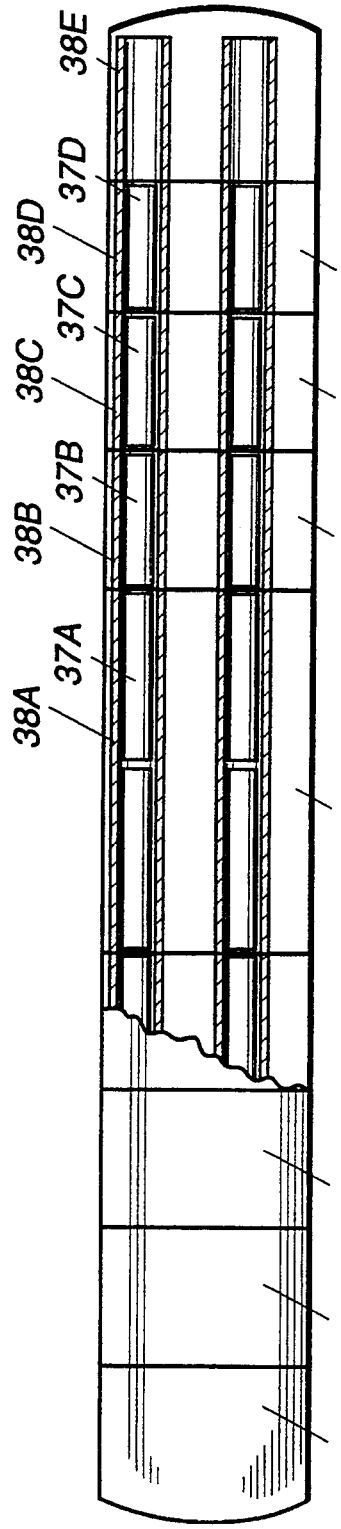
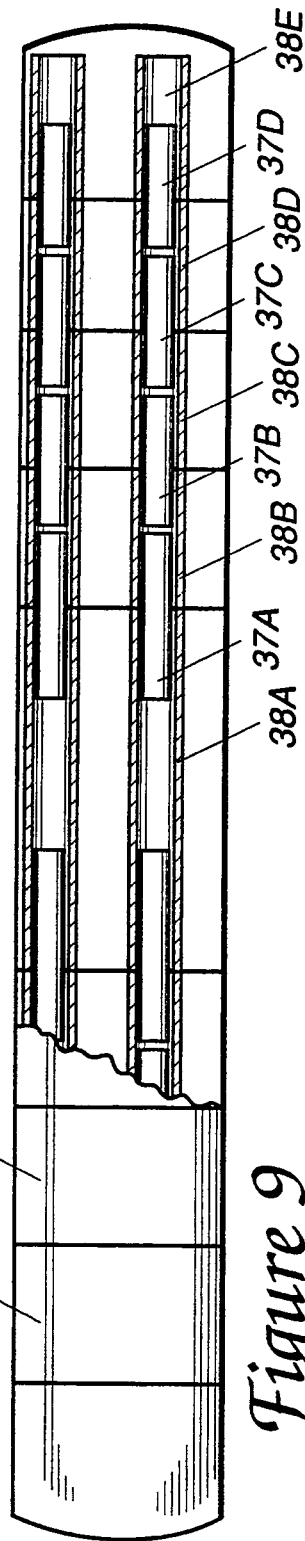
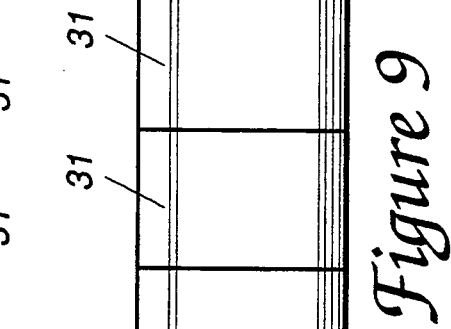
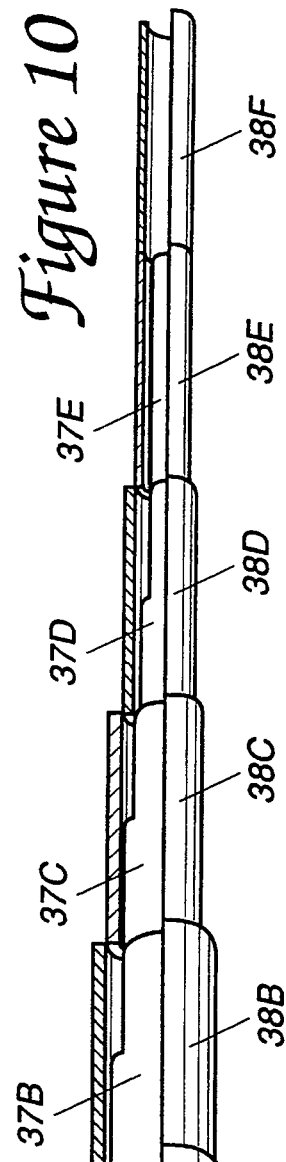

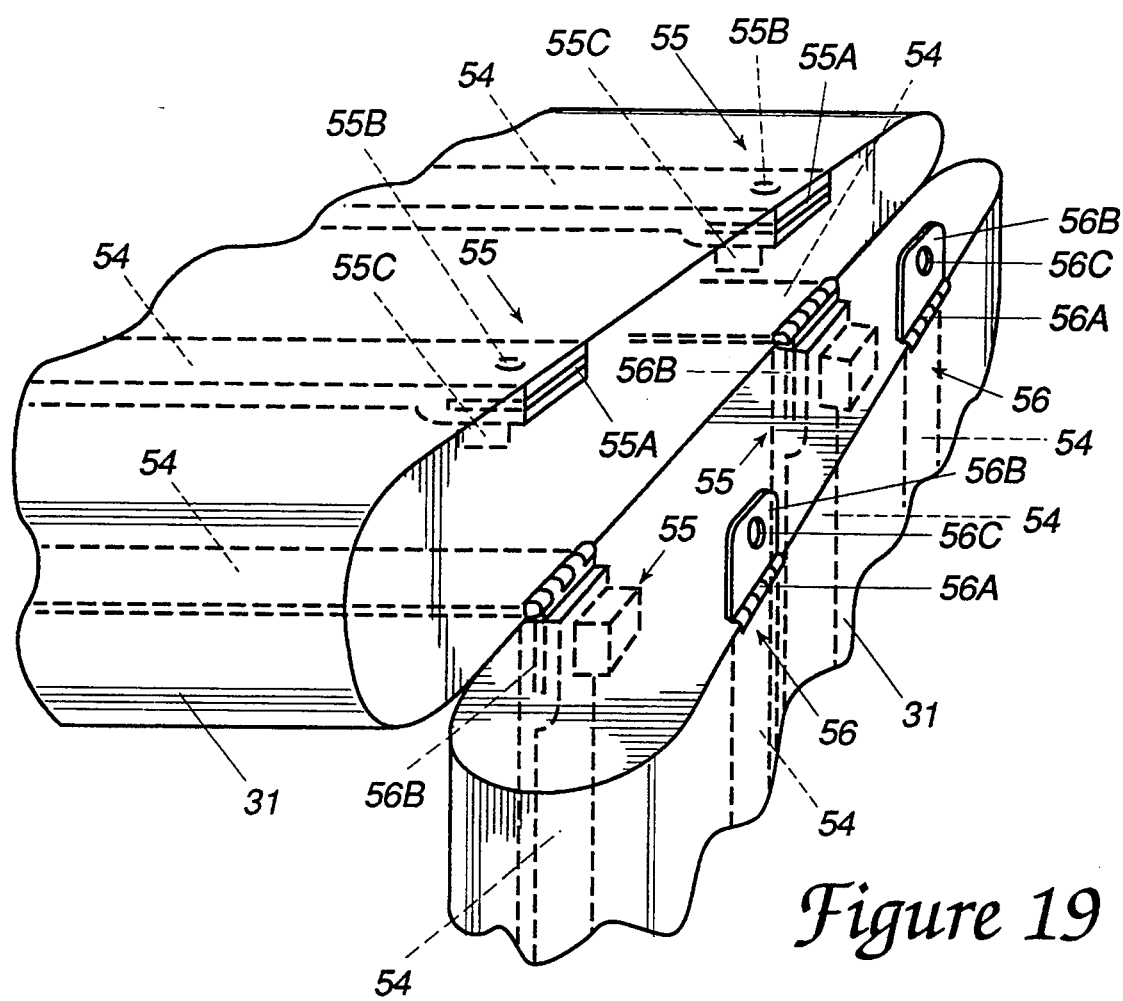
*Figure 19*
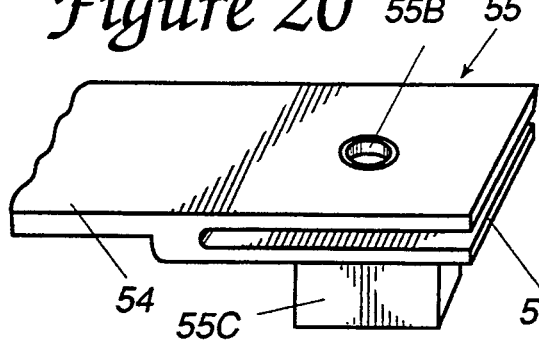
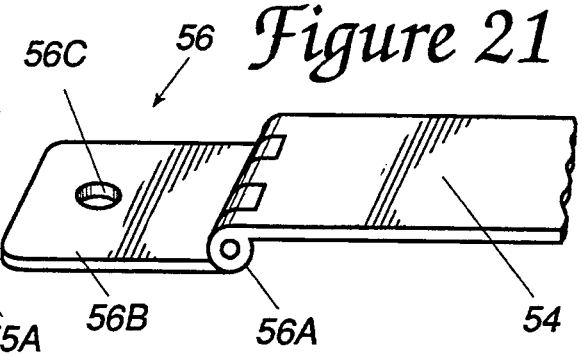
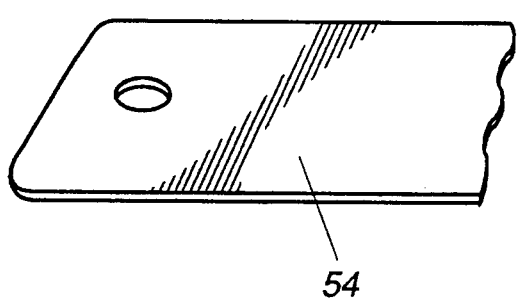
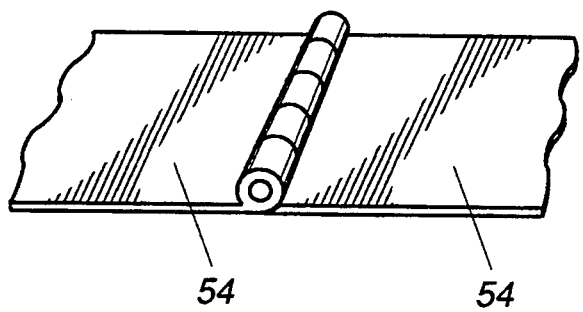

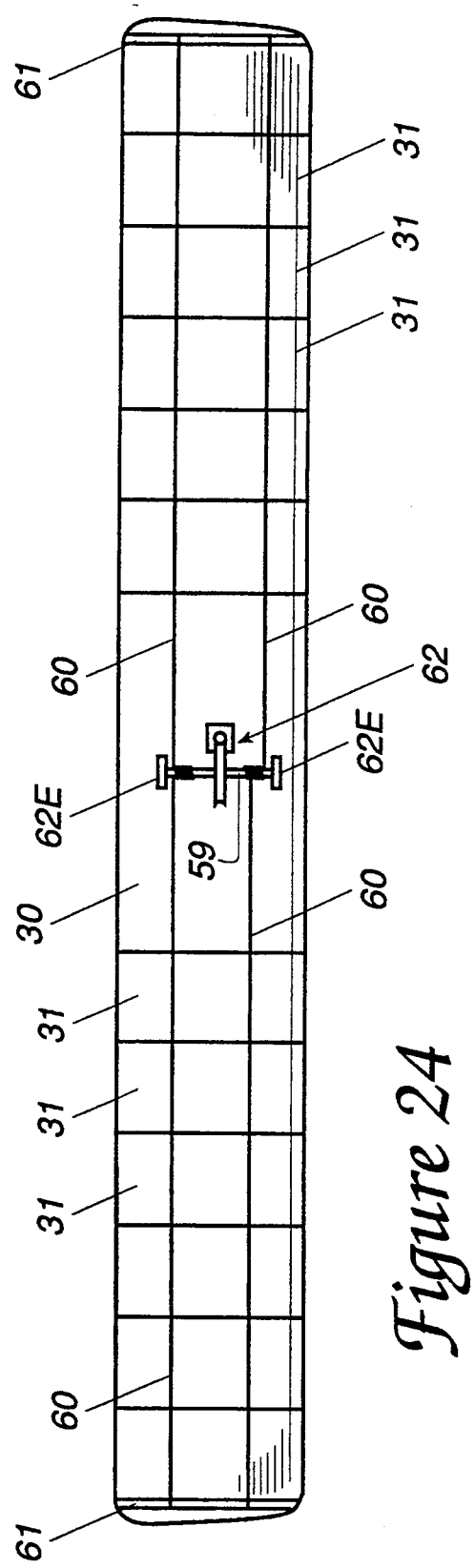
Figure 24
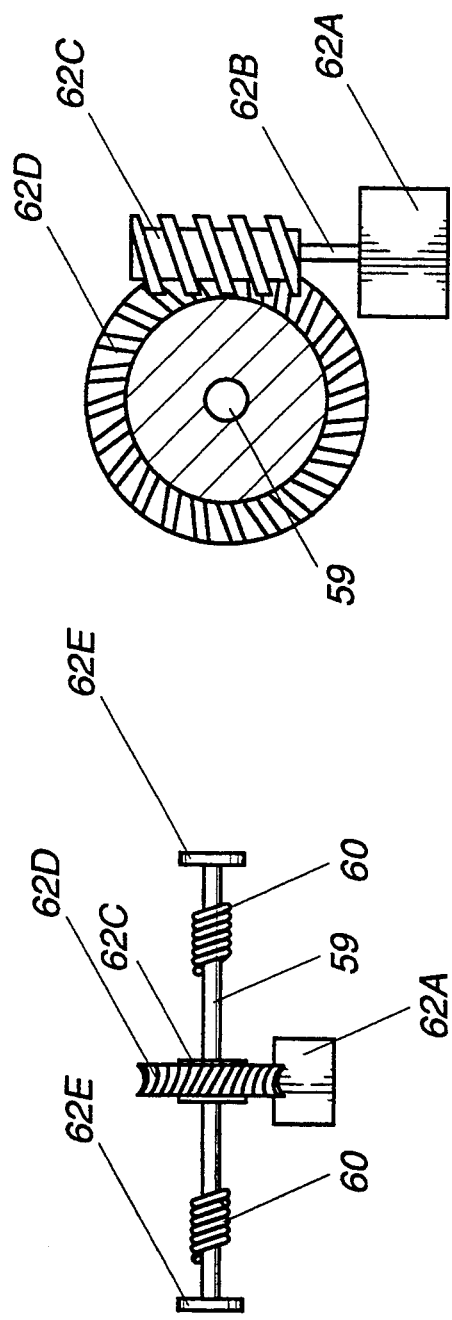
Figure 26
Figure 25

SCORPION WING

BACKGROUND

1. Field of Invention

The present invention relates to a foldable, multisectional airfoil with apparatus enabling it to fold or curl up or down about the body of a craft; and to a system to maintain airfoil rigidity during flight.

2. Description of Prior Art

The advantages of folding aircraft wings, have, in the past, been described largely in terms of ease in storage and transportation. As we approach an age in which—with radically stronger and lighter materials—giant strides will be made in aircraft innovation, the concept of readily foldable airfoil moves from the desirable to the essential.

Since the dawn of flight, myriad systems have been suggested to enable man's "wings", like birds wings, to not only bear weight during flight, but also to fold readily upon landing. Many folding wing designs are disclosed in the art, including semi-rigid airfoils, completely detachable wings, and wings systems that rotate and/or pivot. Yet, despite the multiplicity of designs, none has proved satisfactory for general use in terms of weight, cost, compactness, design simplicity and reliability. The core problem with detachable wings is the very fact that they must be detached, a process that requires time, tools, manpower and exposure to the elements. These disadvantages are equally present in all extant folding wing systems, since expense or complexity of design has almost entirely precluded automation.

Semi-rigid airfoil are more easily automated (see U.S. Pat. No. 3,599,904, filed Jun. 28, 1968) and may not share the disadvantages listed above; however, their use is also limited, as they are not strong enough to serve in heavy or high speed craft.

Rigid wings, on the other hand, possess strength but lack the flexibility of the semi-rigid structure. The rotating and pivoting systems in the art (in which right and left side wing segments move in one piece up or back) represent attempts to add flexibility but they have their own problems: rotating systems decrease the aerodynamics of the vehicle on the ground and pivoting systems can obstruct or limit cargo and passenger space.

In fact, these types of folding systems gain only a little flexibility and may pay a price in diminished safety. In order to gain real flexibility, a rigid airfoil would have to be multisegmented, but thus far additional segmentation has compromised airfoil strength in direct relation to the flexibility gained. Therefore, few multisegmented rigid airfoils are found in the art.

The present invention fulfills the aforementioned objects and overcomes limitations and disadvantages of prior art solutions to existing problems by providing a multisegmented, rigid wing which may be folded or "curled" about the body of an aircraft to permit aerodynamic contours.

INTENTIONS

It is the object of this invention to provide a multisectional airfoil capable of folding or "curling" about the fusilage of an aircraft, yet rigid and strong when extended.

It is a further object of this invention to provide a flexible wing that is capable of being folded up or down or any combination thereof, allowing for unusual variation in folded positions.

It is a further object of this invention to provide a flexible wing that permits the craft to remain aerodynamic even when the airfoil is folded and eliminates the necessity of displacing passenger or cargo space.

It is a further object of this invention to provide a flexible wing with the above characteristics that could be used with hybrid innovations such as air-cars or airplane-helicopters.

It is a further object of this invention to provide a wing with folding capacity readily adaptable to automation with any of a number of power sources including hydraulics.

It is a further object of this invention to provide three separate but complimentary means to maintain airfoil rigidity during flight, any two of which would be sufficient for safety. Each is based on a separate structural concept—an endoskeleton, an exoskeleton, and a pressure system—and is capable of being released to allow the airfoil to fold.

It is a further object of this invention to provide systems for maintaining airfoil rigidity that are built into the airfoil sections easily operated and readily adaptable to automation with any of a number of power sources including hydrolics.

It is a further object of this invention to provide a multisectional folding airfoil and a system for maintaining airfoil rigidity which may both be operated while the aircraft is in motion.

It is a further purpose of this invention to provide a multisectional airfoil and a system for maintaining airfoil rigidity that are adaptable to a wide range of aircraft and suitable for any airfoil location on the craft.

It is a further object of this invention to provide a system for maintaining airfoil rigidity during flight based on a segmented, sliding spar within a sliding spar, which allows the airfoil sections to fold when the joints of both spars are aligned yet provides sufficient rigidity when the joints are offset.

It is the further object of this invention to provide a system for maintaining airfoil rigidity during flight based on continuous yet segmented straps, each segment of which contains hinging and locking mechanisms allowing the airfoil sections to fold and unfold yet which—when locked into place as a continuous strap—provides structural strength to the airfoil whole.

It is the further object of this invention to provide a system for maintaining airfoil rigidity during flight based on a cable system providing pressure from the airfoil tips inward which may also—but need not—be used to assist in raising and lowering the wings.

Readers will find further objects and advantages of the invention from a consideration of the ensuing description and the accompanying drawings.

DRAWING FIGURES

FIG. 4 is a perspective view of an airfoil displaying two way foldability.

FIG. 5 is a perspective view of a final folded position of the airfoil from FIG. 4.

FIG. 6 is a front elevation of an airfoil with extended wing tips in folded position.

FIG. 7 is a front elevation of an airfoil with wing tip rudders, also in folded position.

FIG. 8 is a top plan view of an airfoil revealing outer and inner spar segments in "fold" position.

FIG. 9 is a top plan view of an airfoil revealing outer and inner spar segments in "flight" position.

FIG. 10 is a fragmentary perspective view of a tapered spar apparatus with outer spar segments cut away to reveal inner spar segments. These are aligned in "fold" positions.

FIG. 19 is a fragmentary perspective view detailing the continuous strap apparatus in two adjoining airfoil sections.

FIG. 20 is a detail in perspective of the receiving end of the continuous strap apparatus.

FIG. 21 is a detail in perspective of a protruding end of the continuous strap apparatus.

FIG. 22 is a perspective of a simple protruding end for the continuous strap apparatus.

FIG. 23 is a perspective of a simple hinge for the continuous strap apparatus.

FIG. 24 is a top plan view of an airfoil showing the cable pressure apparatus.

FIG. 25 is a detail in side elevation of the gear assembly for the cable apparatus.

FIG. 26 is a detail in end elevation of FIG. 25.

Figure 1:
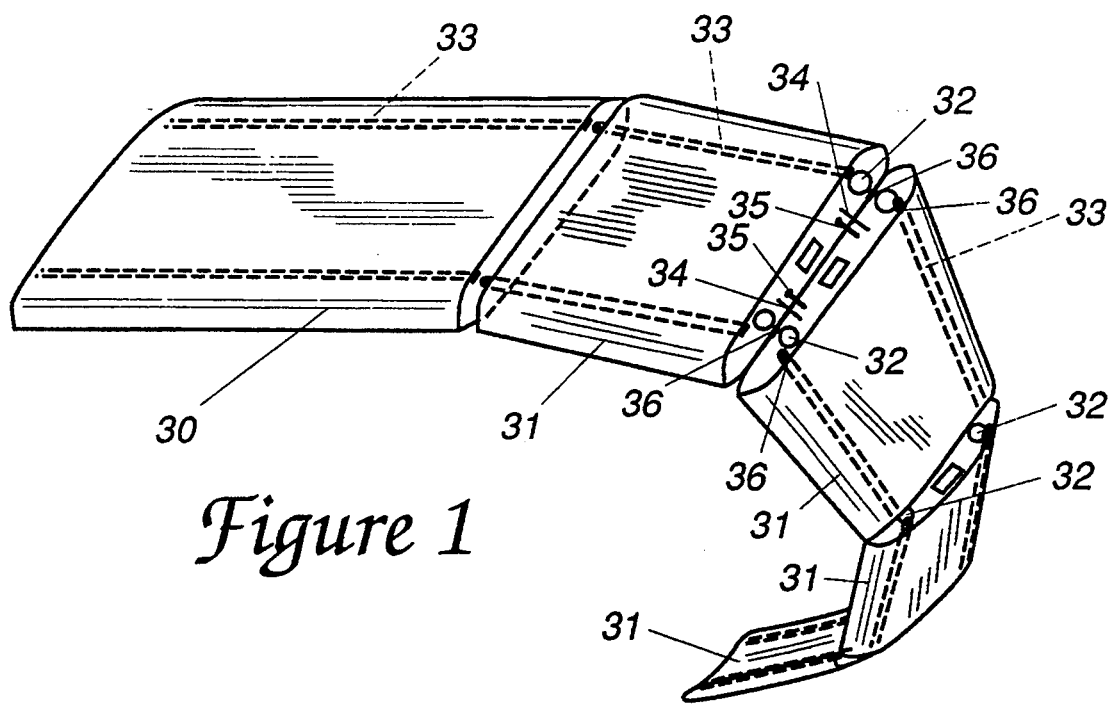
FIG. 1 is a perspective view of the center section and one side of a folding airfoil in folded position.

Drawing Reference Numerals 30 center section
31 outer section
32 sliding spar apparatus
33 continuous strap apparatus
34 cable apparatus
35 hydraulic system
36 pivotal coupling
37 inner spar
37a-d inner spar segments
38 outer sparr
38a-f outer spar
39 center channel
40 cable
41 hydraulic cylinder
42 push rod
43 armed casing
44 outer edges
45 ailerons
46 body
47 fin
48 wing tip sections
49 wing tip rudders
50 inner reinforcement
51 outer reinforcement
52 super inner (center)
53 super outer (center)
54 strap segments
55 receiving ends
55a slot
55b releasable retaining pin
55c electric solenoid
56 protruding ends
56a hinging device
56b tab
56c hole
59 center shaft
60 high tension cables
61 wing tip
62 gear assembly
62a electric power source
62b power shaft
62c screw gear
62d main gear Scorpion Wing—Description FIG. 1 illustrates an embodiment of the invention, in this case a multisectional wing in folded position, comprising a center section 30, four outer sections 31, a hydraulic system 35, coupling mechanisms 36, sliding spar apparatus 32, continuous strap apparatus 33, and cable apparatus 34. The pivotal couplings 36 (shown here as part of the continuous strap apparatus and discussed at length in that section of this description) are used along with the hydraulic system 35 (or other suitable means) to enable the wing assembly to move through its folding and unfolding process.

Figure 2:
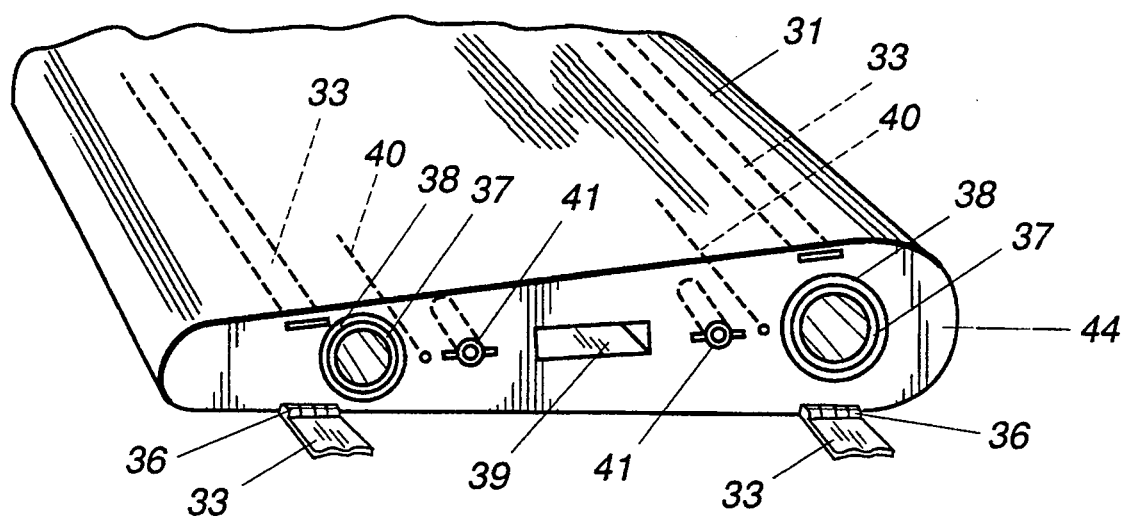
FIG. 2 is a fragmentary perspective view showing the end of a wing section.

The cutaway illustration in FIG. 2 shows the systems and their location in greater detail. The inner spars 37 can be seen inside the outer spars 38, next to the hydraulic cylinders 41. The continuous strap apparatus 33 runs the length of the airfoil section, where it is attached to pivotal couplings 36. This embodiment comprises two separate cables 40 from the cable system apparatus 34, and a center channel 39 through which various lines, wires and hoses can conveniently be run the length of the airfoil.

Figure 3:
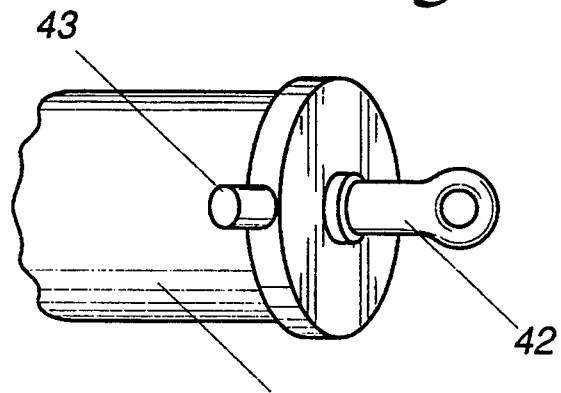
FIG. 3 is a fragmentary perspective view of a hydraulic cylinder with its armed casing.

As seen in FIG. 3, the hydraulic cylinders 41 are equipped with armed casings 43, by which means they pivotally attach to the outer edges 44 of the wing sections 31, and push rods 42, by which means they pivotally attach to the adjoining wing sections.

The pivotal coupling 36 shown in the embodiment in FIGS. 1 and 2 includes both hinges 56(a) (on which an airfoil section may fold or curl) and a coupling system based on tabs 56(b) and slots 55(a) (by which an airfoil section can be released from the adjoining section). This permits each wing section to fold or curl both up and down. These coupling mechanisms are thus utilized both on the top and on the bottom of the airfoil sections in FIG. 1. (They are detailed in FIGS. 19, 20, and 21 following.)

An inherent feature of the hinge and hydraulic system combination is the automatic means provided to lock the airfoil into any particular position.

If the continuous strap apparatus is not utilized as part of the system for maintaining airfoil rigidity on a particular multisectioned airfoil, a similar hinge-fastener mechanism may be included to permit airfoil foldability. Less costly and simpler means to fold (or curl) and unfold (or uncurl) the airfoil can easily be made by utilizing simple hinge and catch mechanisms (as illustrated by FIGS. 22 and 23 following); an alternative method would be utilization of the cable system apparatus can be used to erect the airfoil and a simple spring mechanism can be used to power foldability.

FIG. 4 shows an embodiment of the invention—with segmented aileron 45 built into four wing sections—as it is curling up into its final folded position; some of its sections are folding up, while others fold down. FIG. 5 illustrates one possible final folded position: the airfoil curled about the body 46 and fin 47.

FIG. 6 shows an embodiment of the airfoil in which wing tip sections 48 are lengthened and overlapping when folded or curled;

FIG. 7 shows an embodiment of the airfoil in which wing tip rudders 49 are utilized.

Sliding Spar—Description

The foldable airfoil illustrated in FIGS. 8 and 9 contains both leading edge spar apparatus and trailing edge spar apparatus in a wing. These spar apparatus are comprised of inner spar 37 and outer spar 38, each of which are segmented into a given number of pieces.

Figure 15:
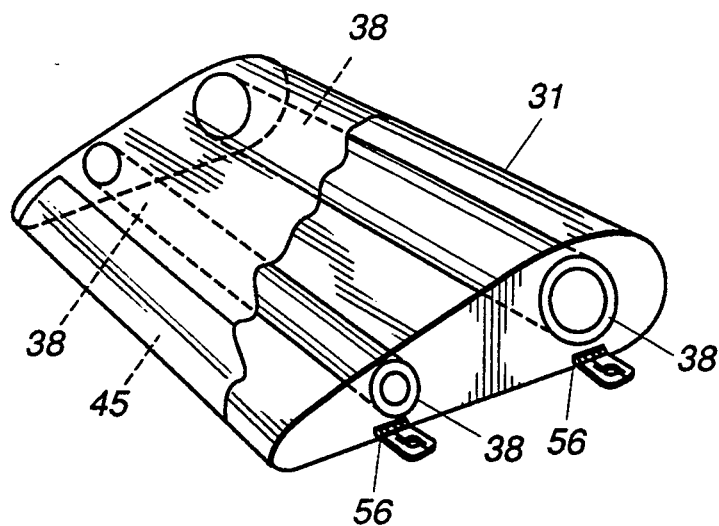
FIG. 15 is a perspective view of a an outer airfoil section showing approximate longitudinal position of outer spar segments.

The outer spar segments 38a-e are build lengthwise into the wing sections; thus, as shown in FIG. 15 the outermost ends of each outer spar segment 38 are permanently located at the outermost end of each wing section (other than the wing tip sections where the outer spar stops short of the actual wing tip.) As shown in FIG. 8, the outer spar segments 38a-e are so located within the wing sections that, when the airfoil is brought to flight position, they are positioned end to end, forming a continuous, though segmented, cylinder within which the inner spar 37 can slide.

Figure 11:
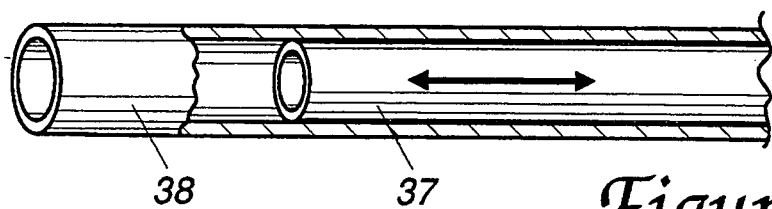
FIG. 11 is a fragmentary perspective view of an outer spar segment partially removed to reveal the sliding inner spar.

The inner spar segments 37a-d are designed to move laterally within the confines of the outer spar as in FIG. 11 while fitting as tightly as possible without impeding such movement. When the ends of the inner spar segments 37a-d are aligned with the ends of the outer spar segments 38a-e as illustrated in FIG. 8 the airfoil is free to fold or curl. However, when the inner spar segments 37a-d are not aligned with the ends of the outer spar segments 38a-e as in FIG. 9, the airfoil cannot fold or curl.

When airfoil rigidity is desired, the inner spar segments 37a-d are shifted by sufficient means (such as hydraulics or pneumatics) to a position of nonalignment halfway through the adjoining outer spar segments as shown in FIG. 9. When airfoil foldability is desired, the inner spar segments 37a-d are shifted back to precise end-to-end alignment with the outer spar segments 38a-e as shown in FIG. 8.

Figure 16:
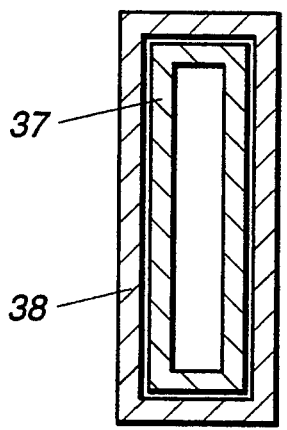
FIG. 16 is an end elevation of an alternative sliding spar shape.
Figure 17:
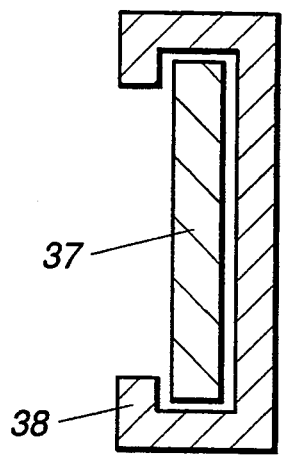
FIG. 17 is an end elevation of another alternative sliding spar shape.

These spar apparatus can be constructed all of one diameter or tapered as appropriate; one possibility of tapering is shown in the embodiment in FIG. 10. The spar apparatus shown in the preferred embodiment are cylindrical but other shapes are possible. FIG. 16 shows a traditional box spar in the slidable form; FIG. 17 shows an alternative spar shape.

Figure 14:
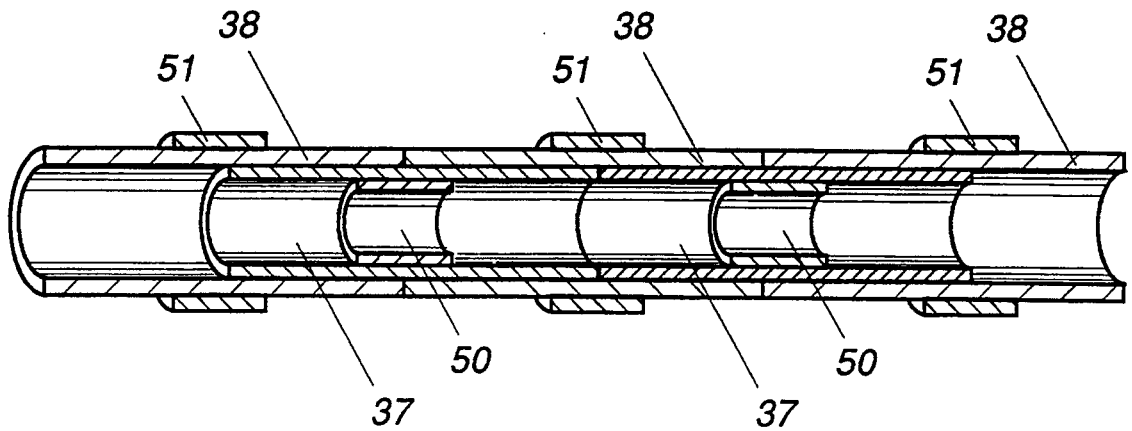
FIG. 14 is a fragmentary sectional view in perspective of one reinforcement possibility for the spar apparatus in the outer wing sections.

The spars must be constructed of a material of suitable strength and should be reinforced at their weakest points. In the embodiment in FIG. 14 the spar is reinforced such that at every point of separation in the outer spar 38, extra reinforcement 50 is provided in the inner spar and vice versa, (outer spar reinforcement 51).

Figure 12:
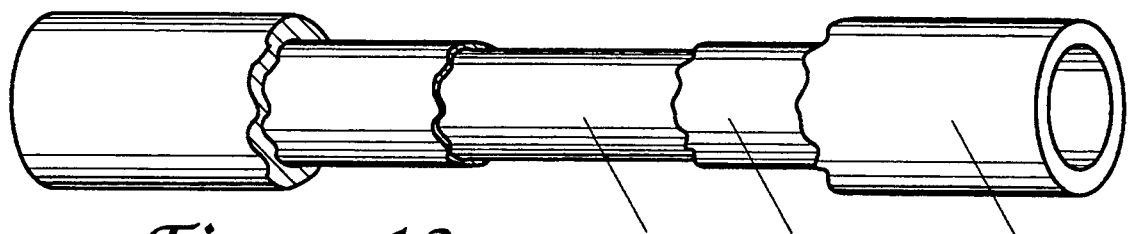
FIG. 12 is a perspective view of the center section of the sliding spar apparatus with both the outer and inner spars partially removed to reveal the reinforcing super inner spar.
Figure 13:
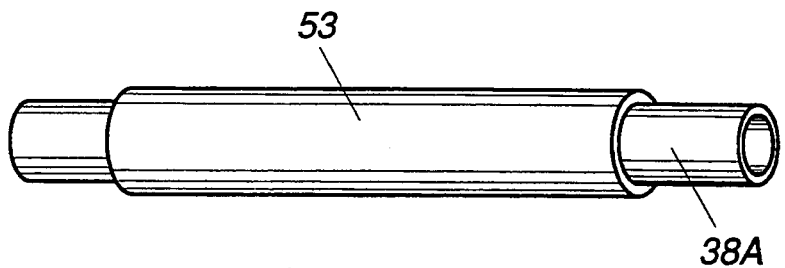
FIG. 13 is another perspective view of the center section of the sliding spar apparatus showing the outer spar with one possible type of outer reinforcement.

The center outer spar section 38a may be reinforced by the addition of a super inner spar 52, as shown in FIG. 12, that fits within the inner spar 37a yet is attached to the outer in such a way that it does not laterally slide when the inner spar slides but remains behind to assist the outer spar in strengthening the center section of the airfoil. Alternatively, the center section may be strengthened by reinforcement 53 fixed to the outer section of the center outer spar segment 38a as shown in FIG. 13.

Strap System—Description

Figure 18:
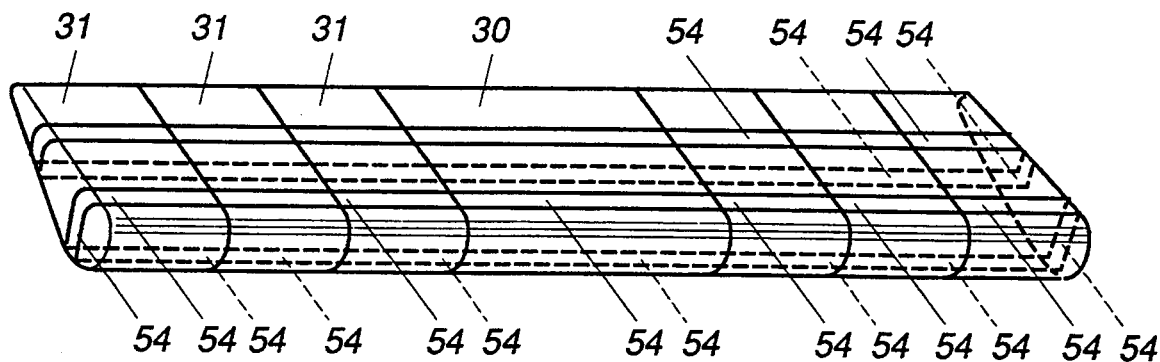
FIG. 18 is a perspective view of an airfoil showing the continuous strap apparatus.
Figure 27:
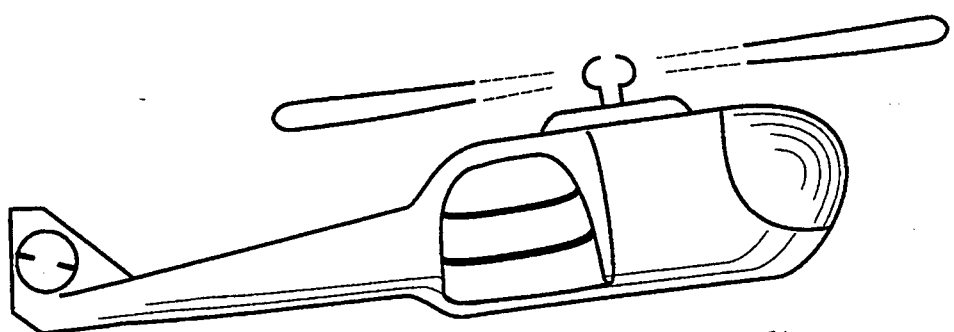
FIG. 27 is a side elevation of a helicopter with S-wings in folded position.
Figure 28:
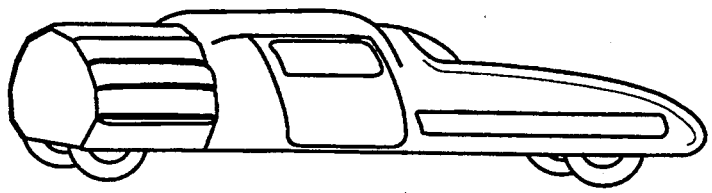
FIG. 28 is a perspective view of an air-car with S-wings in folded position.
Figure 29:
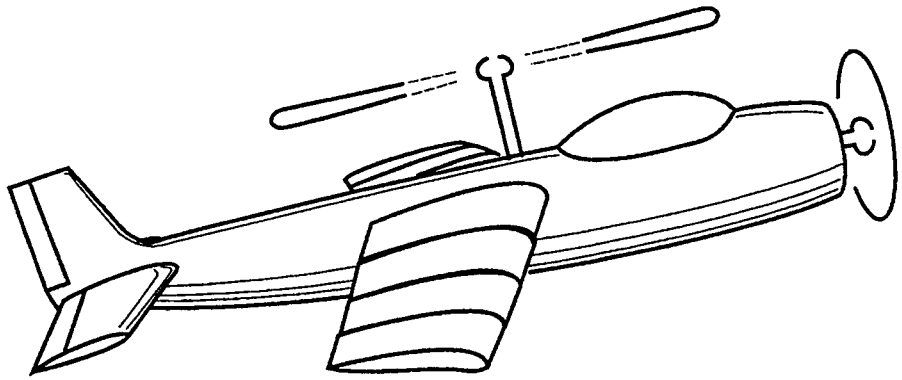
FIG. 29 is a perspective view of a gyroplane with S-wings in flight position.
Figure 30:
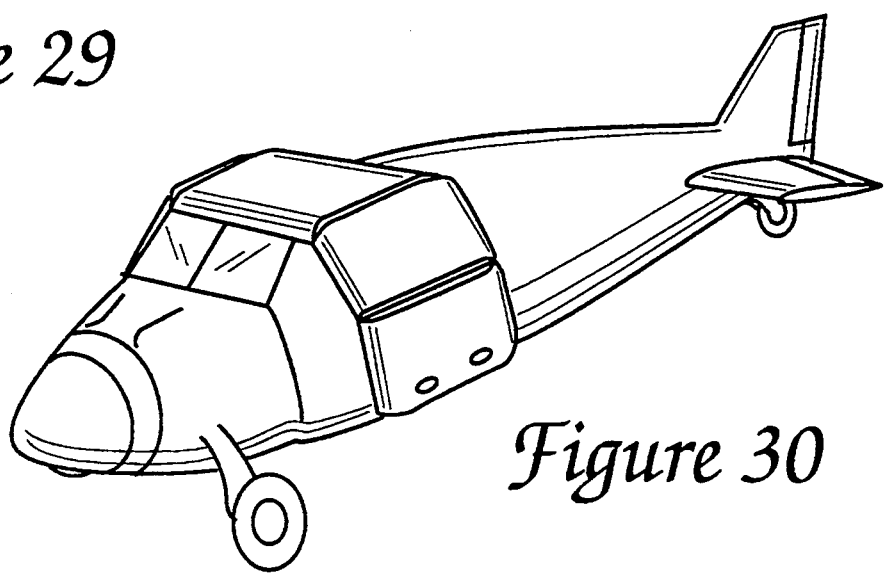
FIG. 30 is a perspective view of a private plane with S-wings in folded position.

FIG. 18 illustrates the "continuous strap" apparatus, shown here in a series of two, built into an airfoil distinct from the airfoil frame, in this case a wing, and encircling it lengthwise from tip to tip. The strap itself is to be divided into segments 54 wherever the airfoil is segmented with appropriate mechanisms for joining the segments into a whole and allowing segmentation for airfoil foldability.

The strap apparatus is detailed in FIG. 19. It is distinct from the airfoil framework. It includes the strap segments 54, the receiving ends 55, and the protruding ends 56. The receiving ends are a continuous, unbroken part of the strap segments, and as such remain in a fixed position within the airfoil sections. They comprise a slot 55(a), a releasable retaining pin 55(b), and a release mechanism for said pin, portrayed in FIGS. 19 and 20 as an electrical solenoid 55(c), which is but one of several viable alternatives. The protruding ends 56 are comprised of the strap segments 54 connected lengthwise with pivotal couplings 36 which include hinges and releasable fastening mechanisms, shown here as protruding ends 56 and receiving ends 55. The protruding ends 56 comprise a hinge 56(a), a tab 56(b), and a hole 56(c); they are attached to the strap segments by means of the hinging device 56(a). When said protruding ends are locked into said receiving ends, they form a single strap.

While FIG. 19 shows the strap in an airfoil, FIGS. 20 and 21 detail the pivotal coupling 36. As the airfoil moves into rigid position, tab 56(b) of the protruding end 56 of each pivotal coupling 36 aligns with and slides into the slot 55(a) of each receiving end 55. The releasable retaining pins 55(b) move from released position through the hole 56(c) of the protruding end 56 to lock the joined segments together.

When airfoil folding is desired, the airfoil outer sections 31 can fold along the axis of the hinging devices 56(a) on the upper side of the airfoil as long as the releasable retaining pins 55(b) of the corresponding pivotal couplings 36 on the lower side of the airfoil are released. Alternatively, when the pivotal couplings 36 on the upper side of the airfoil are released, the airfoil segments 31 can fold on the hinging devices 56(a) on the lower side of the airfoil. The protruding end 56 must be so constructed that the tab 56(b) memorizes and retains its exit position from the slot 55(a) of the receiving end 55, allowing smooth refastening.

This pivotal couple 36 allows the airfoil to fold or curl into a variety of final folded positions. However, if the airfoil is intended to fold or curl solely in one direction, simple hinges and catches can be utilized. FIG. 22 shows a simple protruding end, joined to the strap segment 54 in a continuous, unbroken manner. FIG. 23 shows a simple hinge. In this alternative, simple hinges would be consistently mounted on the top of the airfoil sections and catches on the bottom if the airfoil is intended to fold or curl solely up; or vice versa if it is intended to fold or curl down; if some other final folded position is desired, the hinge may be mounted on the top of some and the bottom of other airfoil sections according to the desired folded shape.

The strap apparatus is ideally situated within the wing covering itself. Alternatively, it should be located as close to the same planar surface as possible without protruding, in order to provide optimal structural strength without obstructing aerodynamic finish. More than two of the strap apparatus may be required to permit folding depending upon airfoil shape.

A flight safety check is easily added to the strap apparatus by building in electrical contact points at the furthermost extension of the releasable retaining pins 55(b) which relay a signal when pins are in fully locked position.

Said pins 55(b) may but need not be wired in such a way as to cause a predetermined program for foldability.

Cable Apparatus—Description

An embodiment of the cable apparatus is illustrated in FIG. 24. It constitutes a cylindrical center shaft 59 running cordwise and placed on center in the center section of an airfoil, the ends of which are suitably mounted to insure both security and rotatability; high tension cables 60 running lengthwise from said shaft through each wing section 31 to outer wing tips; a pressure plate used solely or in combination with the wing tip 61 to dispense forces of said cables and to which cable ends are securely fastened; gear assembly 62; and an electric power source 62a or other suitable automatic means for operation of cable apparatus.

FIGS. 25 and 26 illustrate a more detailed plan of gear and power source arrangement. The main gear 62d is fastened by such construction as to fix permanently to center shaft 59. The screw gear 62c, while interlaced with said main gear, is connected to the power source through power shaft 62b, thereby dictating that any movement of the power source will necessarily be transferred through said pieces to the center shaft upon which cable is wound and to which cable ends are securely fastened by suitable means. Thus, any movement of the power source will wind or unwind the cables on the shaft, lengthening or shortening them and increasing or reducing their tension. An advantage of this arrangement is that, without further mechanisms, the cables are locked into any desired position by stopping the power source. Additionally, in certain cases the cable system can itself be used as a means of bringing a multisegmented airfoil to flight position.

The embodiments of the invention particularly disclosed are presented merely as examples of my invention. Other embodiments, forms or modifications of the invention will readily suggest themselves to those skilled in the art, and the invention is claimed in any of the forms or modifications within the legitimate and valid scope of the appended claims.

I claim:

1. An airfoil comprising a plurality of airfoil sections adjoined in such a way as to form a complete but segmented airfoil; means enabling two or more of said sections to pivot at their adjoining ends while retaining their ordered placement; and means for maintaining airfoil rigidity that also permits two or more of said sections to pivot at their adjoining ends when said means for maintaining airfoil rigidity is released, said means for maintaining airfoil rigidity including a segmented spar system, comprising:
   a) an outer spar segmented into sections and constructed in such a way as to permit a smaller spar to slide within it;
   b) said outer spar segments built into said airfoil sections in such a way that, when said airfoil sections adjoin and form a complete but segmented airfoil, said outer spar segments align end to form a complete but segmented outer spar;
   c) an inner spar sufficiently smaller than said outer spar to permit said inner spar to slide within said outer spar, said inner spar constructed in segments in such a way that, when said airfoil sections adjoin and form a complete but segmented airfoil, said inner spar segments align end to end to form a complete but segmented inner spar;
   d) said spars constructed in such a way that when the end of said inner spar segments align with the ends of said outer spar segments, each of said inner spar segments contacts only one of said airfoil sections, but when said ends of said spar segments are not so aligned, each of said inner spar segments contacts two of said airfoil segments;
   e) means to shift the inner spar segments from the position within said outer spar in which said ends of inner and outer spar segments are aligned, to a position of nonalignment, and to return said inner spar segments to said position of alignment.

2. The airfoil of claim 1 wherein the airfoil sections adjoin end to end.

3. The airfoil of claim 1 wherein the means enabling said sections to pivot includes hinging devices permitting selected sections to pivot in a certain direction.

4. The airfoil of claim 1 in which the means enabling said sections to pivot is built into a means for maintaining airfoil rigidity, said means for maintaining airfoil rigidity comprising:
   a) one or more continuous straps of durable material encircling the airfoil, each of said straps constructed of a plurality of segments;
   b) means to unite two or more of said strap segments into unbroken straps and to release said unbroken straps into said strap segments;
   c) said means to unite and release operating in such a way that certain of said strap segments may be united or released without uniting or releasing the remaining strap segments;
   d) said means to unite and release including hinging devices which permit said airfoil segments to pivot at their upper or lower adjoining ends when the means uniting the strap segments on their opposite adjoining ends is released;
   e) said strap segments being constructed in such a way that when said strap segments are united into unbroken straps, said airfoil sections are also united into an unbroken airfoil.

5. The airfoil of claim 1 wherein said inner spar segments are reinforced at the points of separation of the outer spar segments and the outer spar segments are reinforced at the points of separation of the inner spar segments.

6. The airfoil of claim 1 wherein said means to maintain airfoil rigidity is automated.

7. The airfoil of claim 1 wherein said means for maintaining airfoil rigidity includes a continuous strap system comprising:
   a) one or more continuous straps of durable material encircling the airfoil, each of said straps constructed of a plurality of segments;
   b) means to unite said strap segments into unbroken straps;
   c) means to release said unbroken straps into said strap segments;
   d) said strap segments being constructed in such a way that when said strap segments are united into unbroken straps, said airfoil sections are also united into an unbroken airfoil.

8. The airfoil of claim 7 wherein said means for maintaining airfoil rigidity is automated.

9. The airfoil of claim 1 wherein said means for maintaining airfoil rigidity includes a cable system, comprising:
   a) one or more cables;
   b) means to loosen and tighten the cables;
   c) each of said cables connecting to the tip section of said airfoil and extending from said tip section directly to the center section of said airfoil;
   d) said cables constructed in such a way that when said means tightens said cables, it simultaneously tightens said airfoil sections so as to form an unbroken airfoil.

10. The airfoil of claim 9 wherein said means for maintaining airfoil rigidity is automated.

11. A system for maintaining airfoil rigidity in a sectioned airfoil, comprising:
   a) a plurality of airfoil sections;
   b) an outer spar segmented into sections and constructed in such a way as to permit a smaller spar to slide within it;
   c) said outer spar segments built into said airfoil sections in such a way that, when said airfoil sections adjoin and form a complete but segmented airfoil, said outer spar segments align end to end to form a complete but segmented outer spar;
   d) an inner spar sufficiently smaller than said outer spar to permit said inner spar to slide within said outer spar, said inner spar constructed in segments in such a way that, when said airfrill sections adjoin and form a complete but segmented airfoil, said inner spar segments align end to end to form a second complete but segmented spar;
   e) said spars constructed in such a way that when the ends of said inner spar segments align with the ends of said outer spar segments, each of said inner spar segments contacts only one of said airfoil sections, but when when said ends of said spar segments are not so aligned, each of said inner spar segments contacts two of said airfoil segments;
   f) means to shift the inner spar segments from the position within said outer spar in which said ends of inner and outer spar segments are aligned, to a position of nonalignment, and to return said inner spar segments to said position of alignment.

* * * * *